United States Patent
Grivetti et al.

(10) Patent No.: US 10,336,237 B2
(45) Date of Patent: Jul. 2, 2019

(54) REMOTE CONTROLLED CART

(71) Applicant: Caterpillar Inc., Peoria, IL (US)

(72) Inventors: Tazio Stephan Grivetti, Peoria, IL (US); Mike Hemry, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 134 days.

(21) Appl. No.: 15/352,625

(22) Filed: Nov. 16, 2016

(65) Prior Publication Data

US 2018/0134206 A1    May 17, 2018

(51) Int. Cl.
| | |
|---|---|
| *B60P 3/42* | (2006.01) |
| *B62D 25/20* | (2006.01) |
| *B62D 55/12* | (2006.01) |
| *B62D 55/06* | (2006.01) |
| *B66F 9/06* | (2006.01) |
| *B66F 11/04* | (2006.01) |

(52) U.S. Cl.
CPC ............ *B60P 3/42* (2013.01); *B62D 25/2009* (2013.01); *B62D 55/06* (2013.01); *B62D 55/12* (2013.01); *B66F 9/06* (2013.01); *B66F 11/042* (2013.01)

(58) Field of Classification Search
CPC ........ B60P 3/42; B60P 1/162; B62D 25/2009; B62D 55/06; B62D 55/12; B66F 11/04; G05D 1/0011
See application file for complete search history.

(56) References Cited

U.S. PATENT DOCUMENTS

| | | | |
|---|---|---|---|
| 1,365,402 A | 5/1918 | Holt | |
| 3,269,475 A | 8/1966 | Voelker | |
| 4,062,418 A * | 12/1977 | Misawa | B60P 7/0892 180/8.2 |
| 4,747,457 A * | 5/1988 | Buscaiolo | B62D 51/007 180/19.1 |
| 5,373,708 A * | 12/1994 | Dumoulin, Jr. | A45C 5/146 280/30 |
| 6,408,962 B1 * | 6/2002 | Ryckman | B62B 1/002 180/9.22 |
| 6,866,274 B1 * | 3/2005 | Muscat | B62B 1/268 280/47.131 |
| 8,327,963 B1 * | 12/2012 | Faulkingham | B62B 5/0076 180/167 |

(Continued)

FOREIGN PATENT DOCUMENTS

EP        0485630        3/1993

OTHER PUBLICATIONS http://www.trackbarrow.com/page3.htm, "TrackBarrow 350", Track Barrow, Last viewed on Aug. 10, 2016.

(Continued)

*Primary Examiner* — Anne Marie M Boehler
*Assistant Examiner* — Marlon A Arce
(74) *Attorney, Agent, or Firm* — Miller, Matthias & Hull

(57) ABSTRACT

A remote controlled cart includes a body, an electric battery coupled to the body and a pair of track assemblies coupled to the body. The remote controlled cart includes an electric motor operatively coupled to the battery. The electric motor is configured to supply propulsion power to the pair of track assemblies. The remote controlled cart includes a body cover coupled to a top surface of the body. A top surface of the body cover includes at least one pair of rails. The pair of rails removably couples a task module with the body cover.

19 Claims, 9 Drawing Sheets

(56) References Cited

U.S. PATENT DOCUMENTS

| | | | |
|---|---|---|---|
| 8,783,392 B2* | 7/2014 | Underwood | A61G 5/066 180/6.5 |
| 9,694,859 B2* | 7/2017 | Martel | A63C 11/10 |
| 2007/0188009 A1* | 8/2007 | Pierce | B60G 5/00 298/23 R |
| 2008/0014066 A1* | 1/2008 | Kolesa | B62B 3/08 414/469 |

OTHER PUBLICATIONS http://www.ebay.com/itm/280715005792?rmvSB=true, "Mini Transporter KIPOR KGFC", KIPOR, Last viewed on Aug. 10, 2016.
https://en.wikipedia.org/wiki/Crawler-transporter, "Crawler-transporter", NASA, Last viewed on Aug. 10, 2016.

* cited by examiner

REMOTE CONTROLLED CART

TECHNICAL FIELD

The present disclosure relates to a remote controlled cart for performing a variety of tasks. More specifically, the present disclosure relates to structural aspects of the remote controlled cart.

BACKGROUND

There are many situations which require, for example, multiple items, tools, personnel, or pieces of equipment to be transported from one location to another at a construction worksite, household, or any other application area. Often a vehicle such as a truck or van may be used to transport these items and then a person or a machine unloads and carries the items to the site where they are to be used. Afterwards the items need to be carried back to and loaded into the transport vehicle. This loading, unloading, and carrying can be very time and labor intensive. Further, various types of transport vehicles are required to suit the need of various applications.

One specific example may be a generator on a worksite. Generators are generally used to provide power for a particular set of equipment on a worksite which may need electrical power for operation. There may be a single generator for a particular area of the worksite as it may not be economical to have a separate generator for all equipment as that would incur significant capital costs. However, if the worksite expands over a considerable area, it may be difficult to carry the generator about the worksite as generators are generally heavy.

Powered material transportation options such as a truck provided with a powered crawler tracks and a platform for carrying such loads are known. These solutions mostly require skilled personnel to maneuver the truck and are limited to only a particular set of applications. One of the examples is U.S. Pat. No. 4,747,457 (hereinafter the '457 patent). The '457 patent discloses a truck for transporting bulky loads. The truck includes a frame provided with lateral crawler tracks and an upper load carrying platform movable in relation to the frame. The truck further includes a trolley assembly connected to the frame for relative movement to lift the tracks off the ground. However, the truck disclosed in the '457 patent does not offer a versatile solution for material transportation needs.

Therefore, a versatile work tool is required for a broad spectrum of users which may require powered assistance for making a wide variety of tasks easier.

SUMMARY

In an aspect of the present disclosure, a remote controlled cart includes a body, an electric battery coupled to the body and a pair of track assemblies coupled to the body. The remote controlled cart includes an electric motor operatively coupled to the battery. The electric motor supplies propulsion power to the pair of track assemblies. The remote controlled cart includes a body cover coupled to a top surface of the body. A top surface of the body cover includes at least one pair of rails. The pair of rails removably couples a task module with the body cover.

In another aspect of the present disclosure, a remote controlled cart includes a body, an electric battery coupled to the body, and a pair of track assemblies coupled to the body. The remote controlled cart includes an electric motor operatively coupled to the battery. The electric motor supplies propulsion power to the pair of track assemblies. The remote controlled cart includes a body cover coupled to a top surface of the body. The remote controlled cart includes at least one pair of rails attached to a top surface of the body cover. The remote controlled cart further includes a personnel lift platform removably coupled to the pair of rails. The personnel lift platform includes a floor and a plurality of support pillars attached to the floor along a periphery of the floor. The personnel lift platform includes a pair of guide rails supported by the plurality of support pillars. The pair of guide rails is located along the periphery of the floor in a vertically spaced apart manner. The personnel lift platform further includes an extendable mast coupled to the pair of rails attached to the body cover. The extendable mast extends across the floor. The extendable mast includes multiple collapsible portions which extended to lift the personnel lift platform above the remote controlled cart.

In yet another aspect of the present disclosure, a remote controlled cart includes a body, an electric battery coupled to the body and a pair of track assemblies coupled to the body. The remote controlled cart includes an electric motor operatively coupled to the battery. The electric motor supplies propulsion power to the pair of track assemblies. The remote controlled cart includes a body cover coupled to a top surface of the body. The remote controlled cart includes at least one pair of rails attached to a top surface of the body cover. The remote controlled cart further includes a load carrying box coupled to the pair of rails. The load carrying box includes a floor and multiple walls coupled to the floor.

DETAILED DESCRIPTION

Wherever possible, the same reference numbers will be used throughout the drawings to refer to same or like parts.

Figure 1:
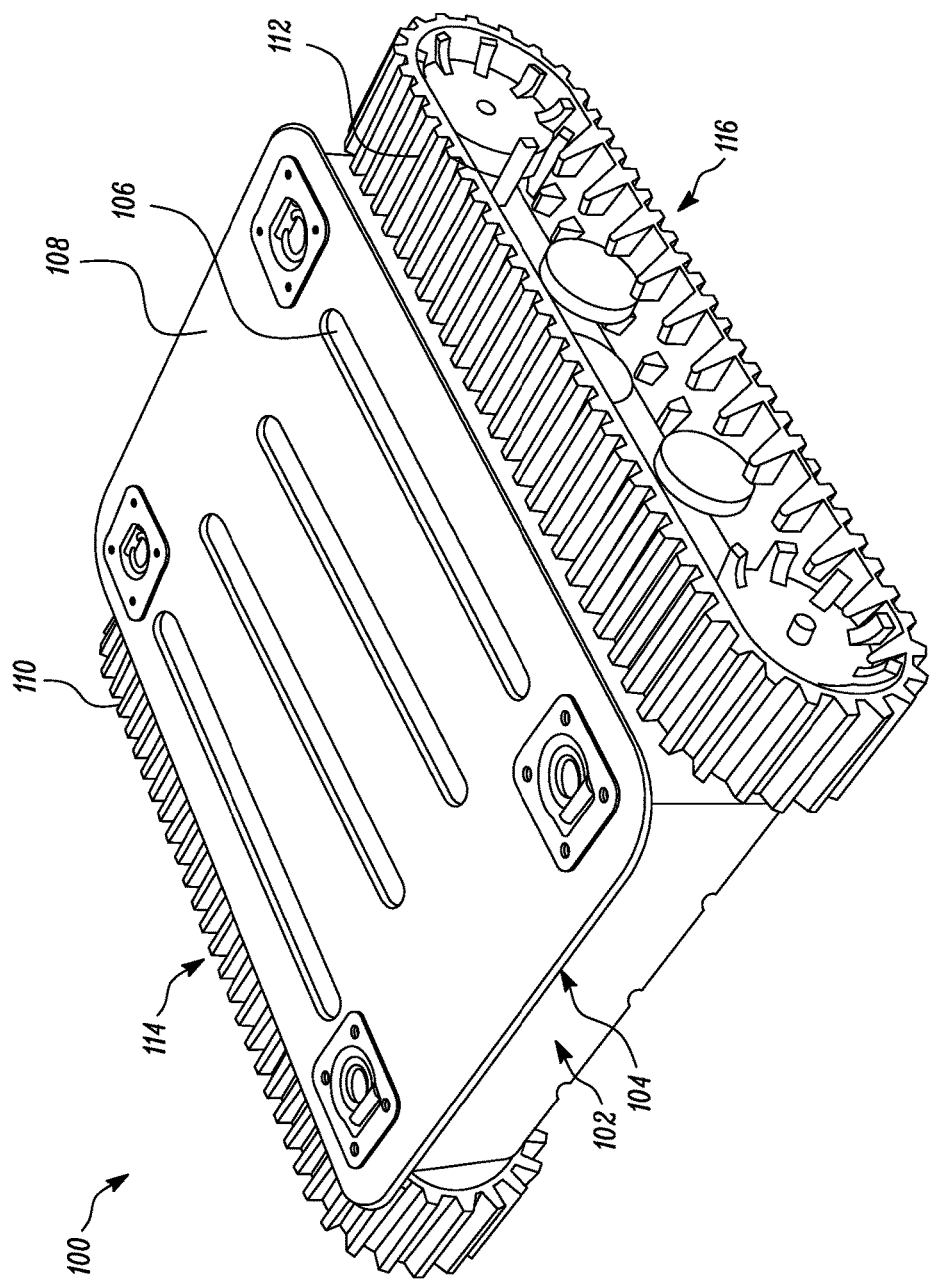
FIG. 1 is a perspective view of a remote controlled cart, in accordance with an embodiment of the present disclosure.

A remote controlled cart 100 is shown in FIG. 1. The remote controlled cart 100 may be used to carry a variety of loads on a worksite, as well as for various recreational purposes. The remote controlled cart 100 may be remotely controlled by a hand held control device, a user interface, a joystick or any other such means (not shown). The remote controlled cart 100 includes means to receive signals from any such device. The remote controlled cart 100 may also include means to transmit signals to such a device. Functions of the remote controlled cart 100 such as a forward movement, a reverse movement, a turning movement, picking up a load, dumping a load etc. may be remotely controlled.

The remote controlled cart 100 includes a body 102. The body 102 may be made up of sheet metal parts joined together by welding, mechanical fasteners or any other mechanical joining process. The body 102 may also be made by casting the body 102 as a single part, or extrusion. The body 102 may be made by any other manufacturing process as well which may be suitable to the present disclosure. The body 102 may be a rectangular or square box shaped structure having four walls mounted on a base plate. In one embodiment, the body 102 may be an integral sheet metal structure. A body cover 104 is removably attached to a top surface of the body 102 through any suitable mechanical joining means. In an embodiment, the body cover 104 is coupled to the top surface of the body 102 by mechanical fasteners such as nuts and bolts (not shown). The body cover 104 has at least one pair of recesses 106 defined on a top surface 108 of the body cover 104. In the illustrated embodiment, the top surface 108 of the body cover 104 includes two pairs of recesses 106 defined on the top surface 108 of the body cover 104. The recesses 106 are located on the top surface 108 of the body cover 104 in a symmetrical manner and extend across the body cover 104.

Figure 2:
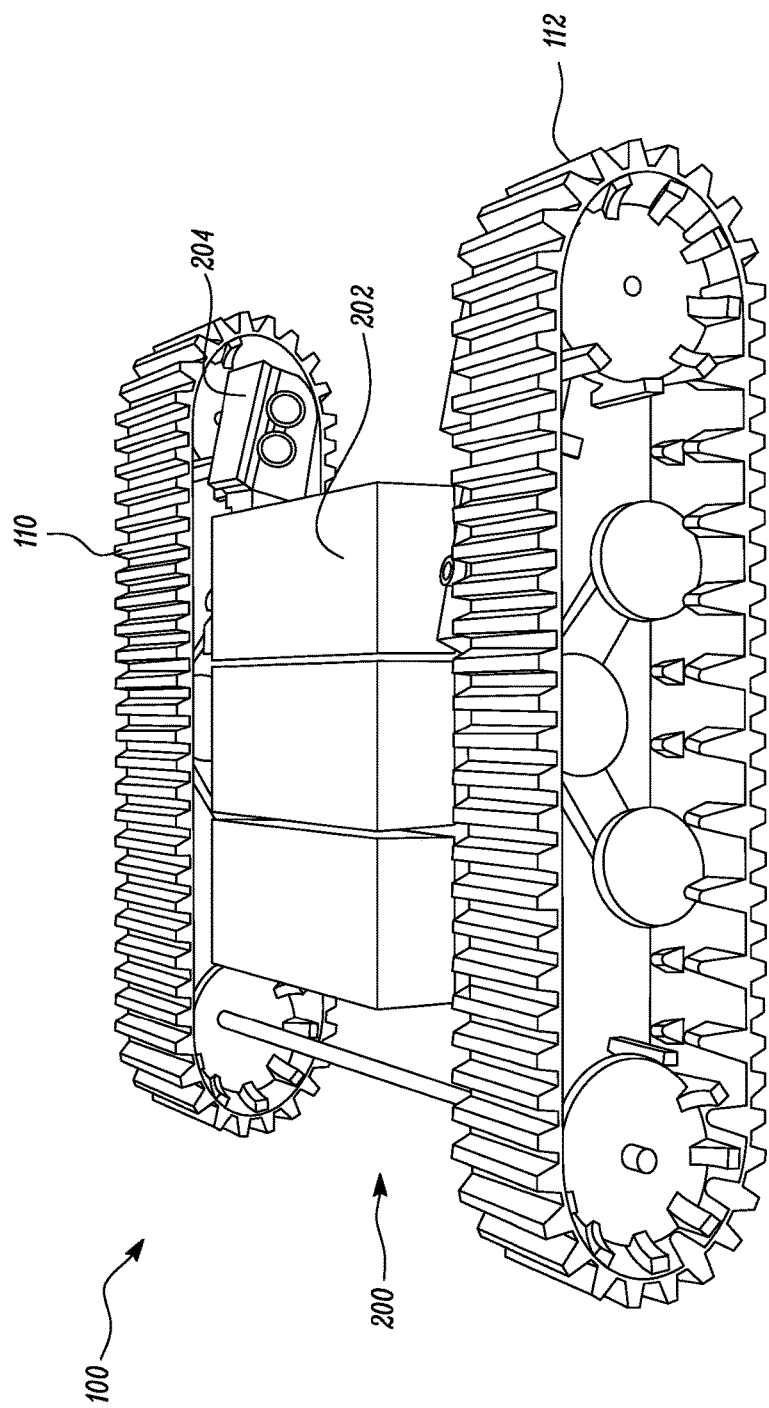
FIG. 2 is a side perspective view of the remote controlled cart showing components of a powertrain of the remote controlled cart, in accordance with an embodiment of the present disclosure.

A pair of track assemblies are carried by the body 102 for propelling the body 102. The pair of track assemblies includes a first track assembly 110 and a second track assembly 112. The first track assembly 110 is positioned on a first side 114 of the body 102 and the second track assembly 112 is positioned on a second side 116 of the body 102. The first track assembly 110 and the second track assembly 112 may be powered by an electric powertrain 200. FIG. 2 shows components of the electric powertrain 200 of the remote controlled cart 100 powering the first and second track assemblies 110, 112. The body 102 has been taken out only for illustrating the components of the electric powertrain. The electric powertrain 200 includes an electric battery 202 coupled to the body 102. The electric battery 202 may be any kind of a suitable electric battery which stores electrical energy and suits the need of the present disclosure. An electric motor 204 is coupled to the first track assembly 110. The electric motor 204 is operatively coupled to the electric battery 202 and derives operational power from the electric battery 202. The electric motor 204 provides propulsion power to the first track assembly 110. A similar electric motor (not shown) coupled to the electric battery 202 may provide propulsion power to the second track assembly 112. Various other components such as electrical connections, mountings, shafts etc. may also be a part of the electric powertrain 200 but are not being discussed here. It should be understood that the body 102 and the body cover 104 together enclose the various components of the electric powertrain 200.

Figure 3:
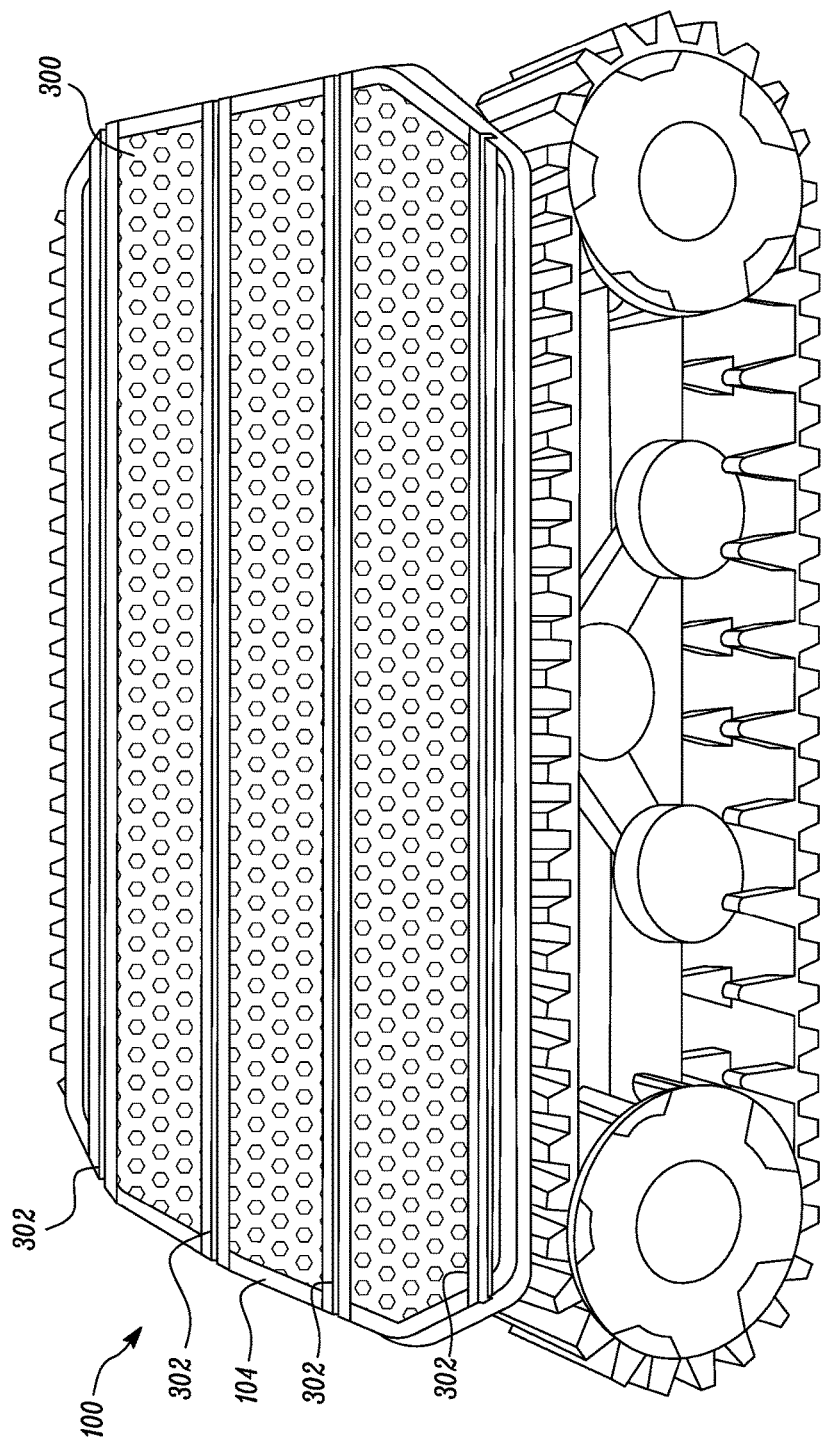
FIG. 3 is a side perspective view of the remote controlled cart with a non-slip mat and rails attached to top of the remote controlled cart, in accordance with an embodiment of the present disclosure.

FIG. 3 shows the remote controlled cart 100 with a non-slip mat 300 attached to the top surface 108 (shown in FIG. 1) of the body cover 104. The non-slip mat 300 may be attached to the top surface 108 of the body cover 104 by adhesive means. The non-slip mat 300 may be attached to the top surface 108 of the body cover 104 by any other means as well which may be suitable as per the need of the present disclosure. In one embodiment, the non-slip mat 300 may be made of a material that includes a rubber component. The non-slip mat 300 may have a hexagonal pattern imprinted thereon to increase friction and provide a better grip. The non-slip mat 300 may have any other shape of pattern imprinted as well.

The remote controlled cart 100 further includes rails 302 attached to the top surface 108 of the body cover 104. The rails 302 are provided in the top surface 108 of the body cover 104, and may be positioned over the recesses 106 defined on the top surface 108 of the body cover 104. The rails may be formed from any metallic material such as aluminum etc. Two pairs of the rails 302 are attached on the top surface 108 of the body cover 104 in the illustrated embodiment. However, it should be contemplated that number of the rails 302 as well as the recesses 106 on the top surface 108 of the body cover 104 may be altered based on the need of the application for which the remote controlled cart 100 is to be used. The rails 302 may be configured to couple a task module to the body cover 104. The task module may be an attachment which may be coupled to the remote controlled cart 100 to accomplish certain task such as carrying a load, lifting an object, etc. The task module may be removably coupled to the remote controlled cart 100. Multiple task modules may be present at a worksite, and may be attached and detached from the remote controlled cart 100 through use of the rails 302 as per the need of the application for which the remote controlled cart 100 is to be used.

Figure 4:
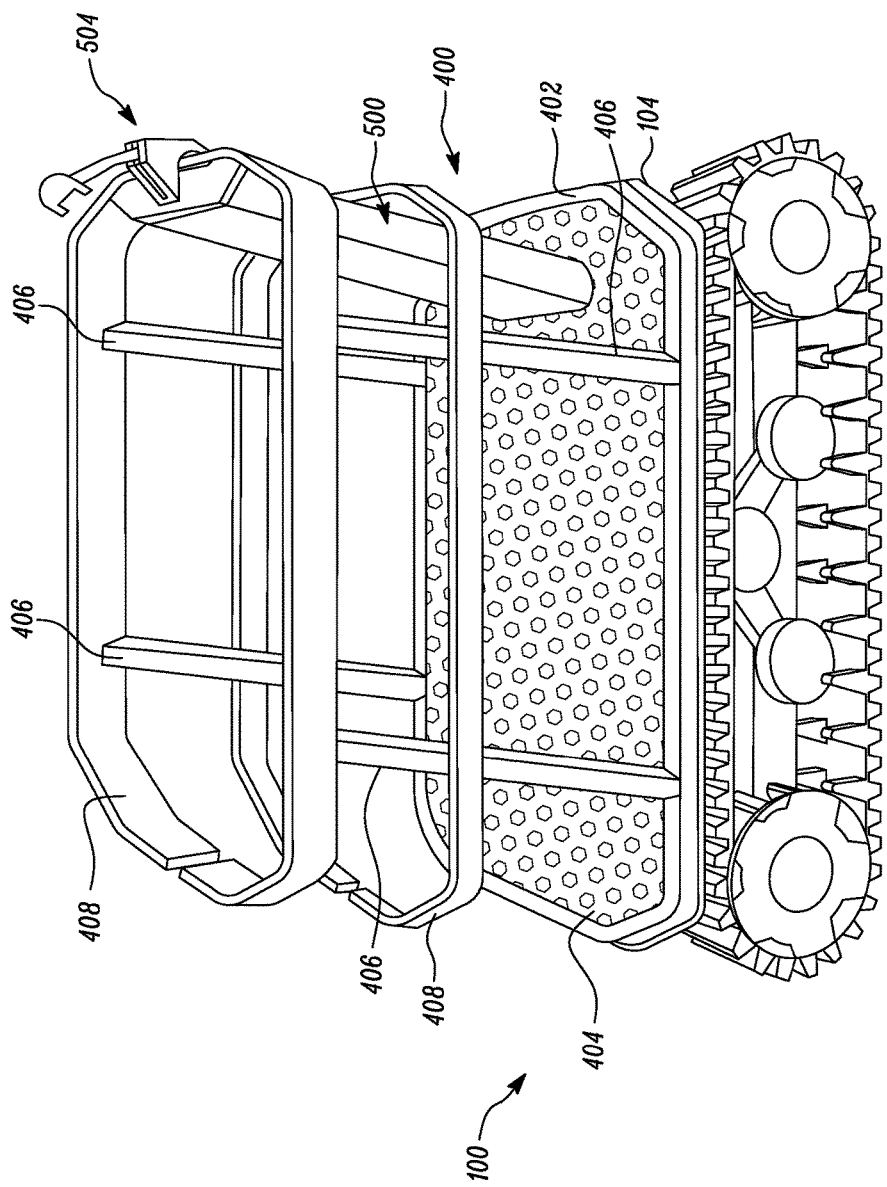
FIG. 4 is a side perspective view of the remote controlled cart having a personnel lift module attached to top of the remote controlled cart, in accordance with another embodiment of the present disclosure.
Figure 5:
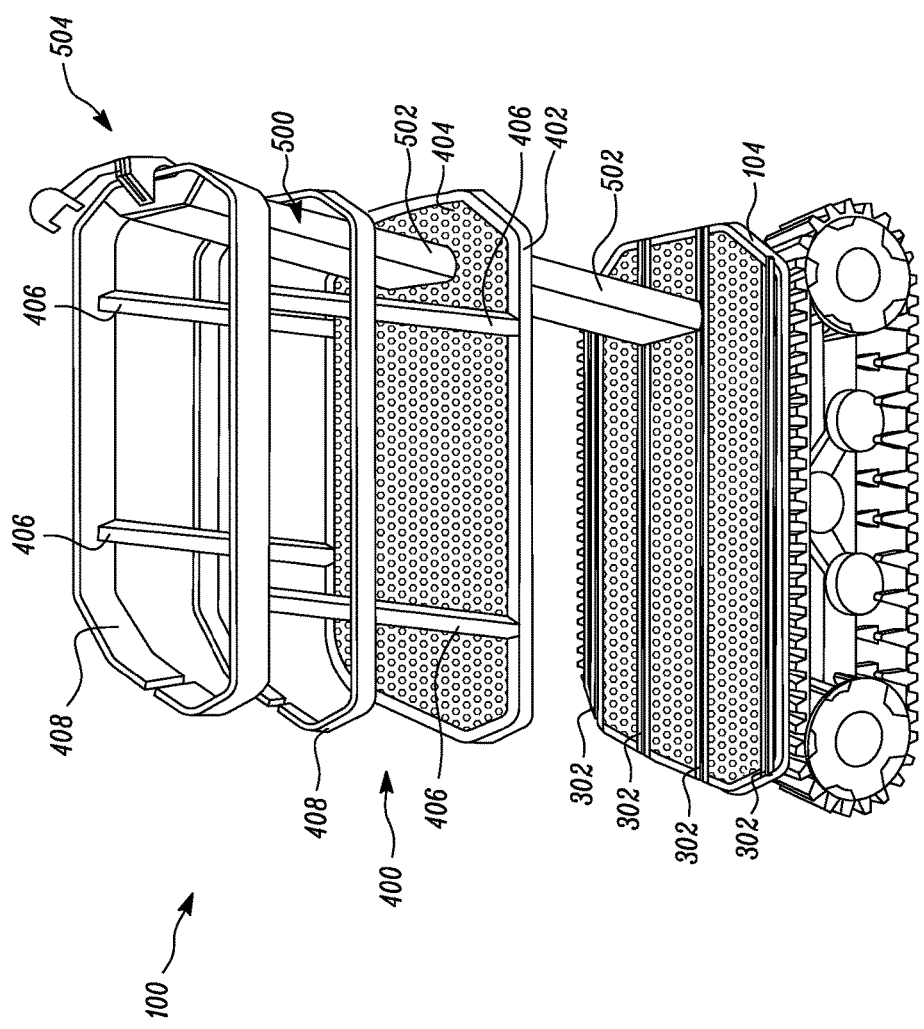
FIG. 5 is a side perspective view of the remote controlled cart of FIG. 4 showing the personnel lift module in an extended position, in accordance with an embodiment of the present disclosure.

FIGS. 4 & 5 illustrate the remote control cart 100 having a personnel lift platform 400 attached to the remote controlled cart 100 as the task module. The personnel lift platform 400 may be used to carry a personnel working on a worksite from one place to another. Also, the personnel lift platform 400 provides an option of vertically lifting the personnel. With combined reference to FIGS. 4 & 5, the personnel lift platform 400 is removably coupled to the rails 302. The personnel lift platform 400 includes a floor 402. The floor 402 may include a structure complementary to the structure of the rails 302 attached to bottom of the floor 402 so that the floor 402 is engaged with the rails 302 and couples the personnel lift platform 400 with the remote controlled cart 100. A non-slip mat 404, similar to the non-slip mat 300 attached to the top surface 108 of the body cover 104, may be attached to the floor 402. The non-slip mat 404 may have a hexagonal pattern, or any other suitable pattern imprinted on the non-slip mat 404 as per the need of the application for which the remote controlled cart 100 is being used. The non-slip mat 404 may be attached to the floor 402 by adhesive means, or any other means suitable to the need of the present disclosure.

The personnel lift platform 400 includes multiple support pillars 406 attached to the floor 402. The support pillars 406 are attached to the floor 402 along a periphery of the floor 402. The support pillars 406 may be attached to the floor 402 by any suitable mechanical joining means such as welding, or mechanical fasteners etc. In the illustrated embodiment, the personnel lift platform 400 includes four support pillars 406 attached to the floor 402. However, number of the support pillars 406 may vary as per the need of the application for which the remote controlled cart 100 is being used. The personnel lift platform 400 includes a pair of guide rails 408 supported by the support pillars 406. The guide rails 408 may be sheet metal strips having bends at appropriate locations to form illustrated shape. The pair of guide rails 408 includes two guide rails 408 parallel to each other. The guide rails 408 run along the periphery of the floor 402 in a vertically spaced apart manner. Height of the guide rails 408 above the floor 402 may be varied based on the personnel being lifted by the personnel lift platform 400.

The personnel lift platform 400 further includes an extendable mast 500 coupled to the pair of the guide rails 408 attached to the body cover 104. The extendable mast 500 may be coupled to the pair of guide rails 408 through any suitable joining means. The extendable mast 500 provides support to the pair of guide rails 408 in addition to the support pillars 406. The extendable mast 500 extends across the floor 402 of the personnel lift platform 400. The floor 402 may include a hole or a slot matching a cross-sectional shape of the extendable mast 500 so as to allow the extendable mast 500 to extend across the floor 402. The extendable mast 500 may include multiple collapsible portions 502. The multiple collapsible portions 502 may extend together to lift the personnel lift platform 400 to a desired height. Although, only two collapsible portions 502 are shown in the illustrated embodiment, it should be understood that number of the collapsible portions 502 may vary based on lifting height required according to the application for which the remote controlled cart 100 is to be used.

The extendable mast 500 further includes a user interface 504 having means to control vertical lift of the personnel lift platform 400 above the remote controlled cart 100. The user interface 504 may be any type of a device which may have means to input instructions for controlling movement of the personnel lift platform 400. The user interface 504 may be a joystick, a touchscreen panel, or any other such device. The user interface 504 may also include means to control movement of the remote controlled cart 100. A personnel standing on the personnel lift platform 400 may control the remote controlled cart 100 as well as the personnel lift platform 400 simultaneously through the user interface 504. It should be contemplated that the personnel lift platform 400 may also be remotely controlled in a similar manner as the remote controlled cart 100.

Figure 6:
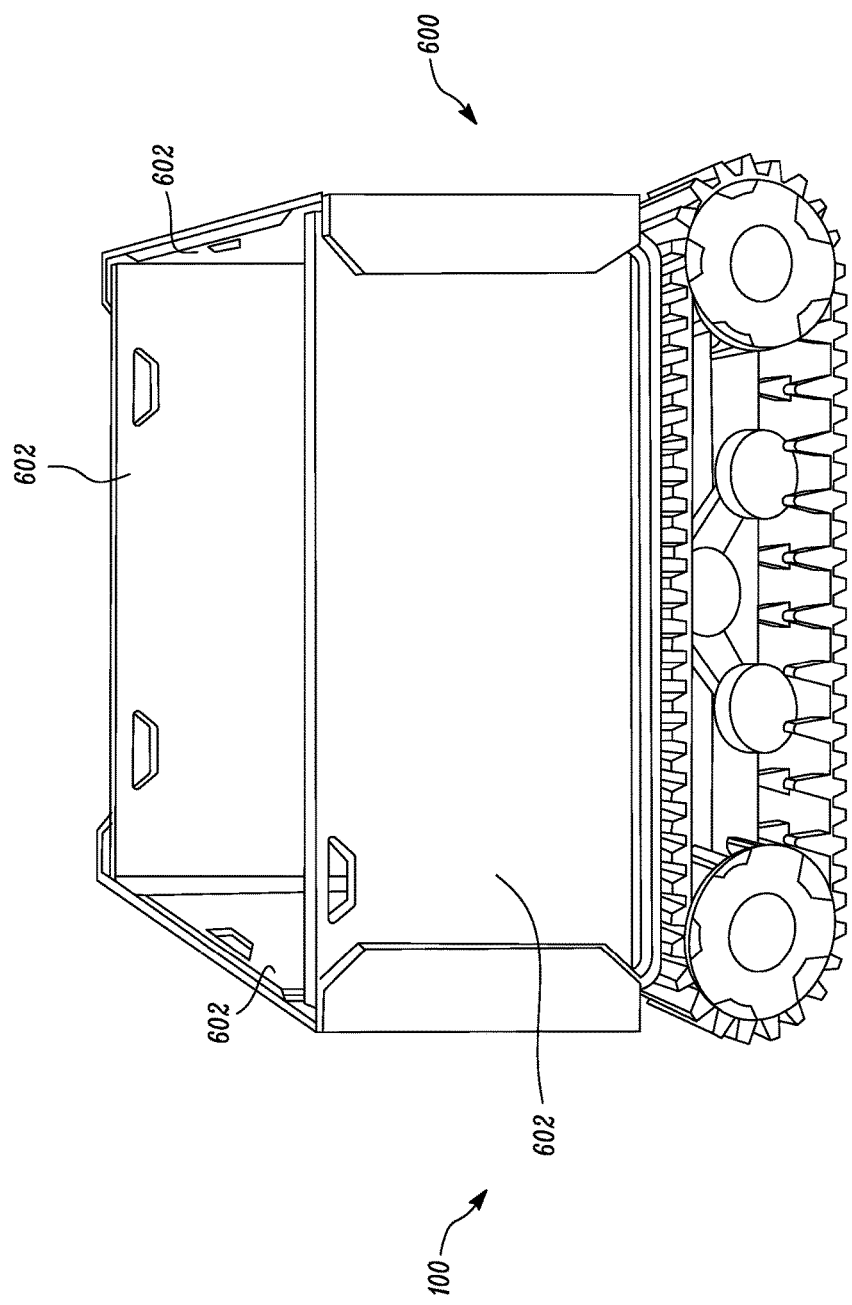
FIG. 6 is a side perspective view of the remote controlled cart having a load box attached to top of the remote controlled cart, in accordance with another embodiment of the present disclosure.

FIG. 6 shows another embodiment of the present disclosure. The remote controlled cart 100 includes a load carrying box 600 coupled to the pair of rails 302 on the top surface 108 of the body cover 104. The load carrying box 600 includes multiple walls 602 coupled to a floor (not shown). In the illustrated embodiment, the load carrying box 600 includes four walls 602. However, the load carrying box 600 may also include two walls 602 to carry a load having a length greater than a length of the remote controlled cart 100, for example pipes. The floor of the load carrying box 600 is coupled to the rails 302 on the top surface 108 of the body cover 104. The floor of the load carrying box 600 may include a structure complementary to the structure of the rails 302 attached to bottom of the floor so that the floor gets engaged with the rails 302 and couples the personnel lift platform 400 with the remote controlled cart 100. The floor may include slots or grooves to couple the walls 602 to the floor. The walls 602 may also be coupled to the floor by any other means suitable to the need of the present disclosure. The walls 602 of the load carrying box 600 may be tilted on sides to dump a load being carried by the load carrying box 600. In one embodiment, at least one of the walls 602 is provided with a tilt mechanism for tilting the wall 602 so as to dump the load being carried by the load carrying box 600.

Figure 7:
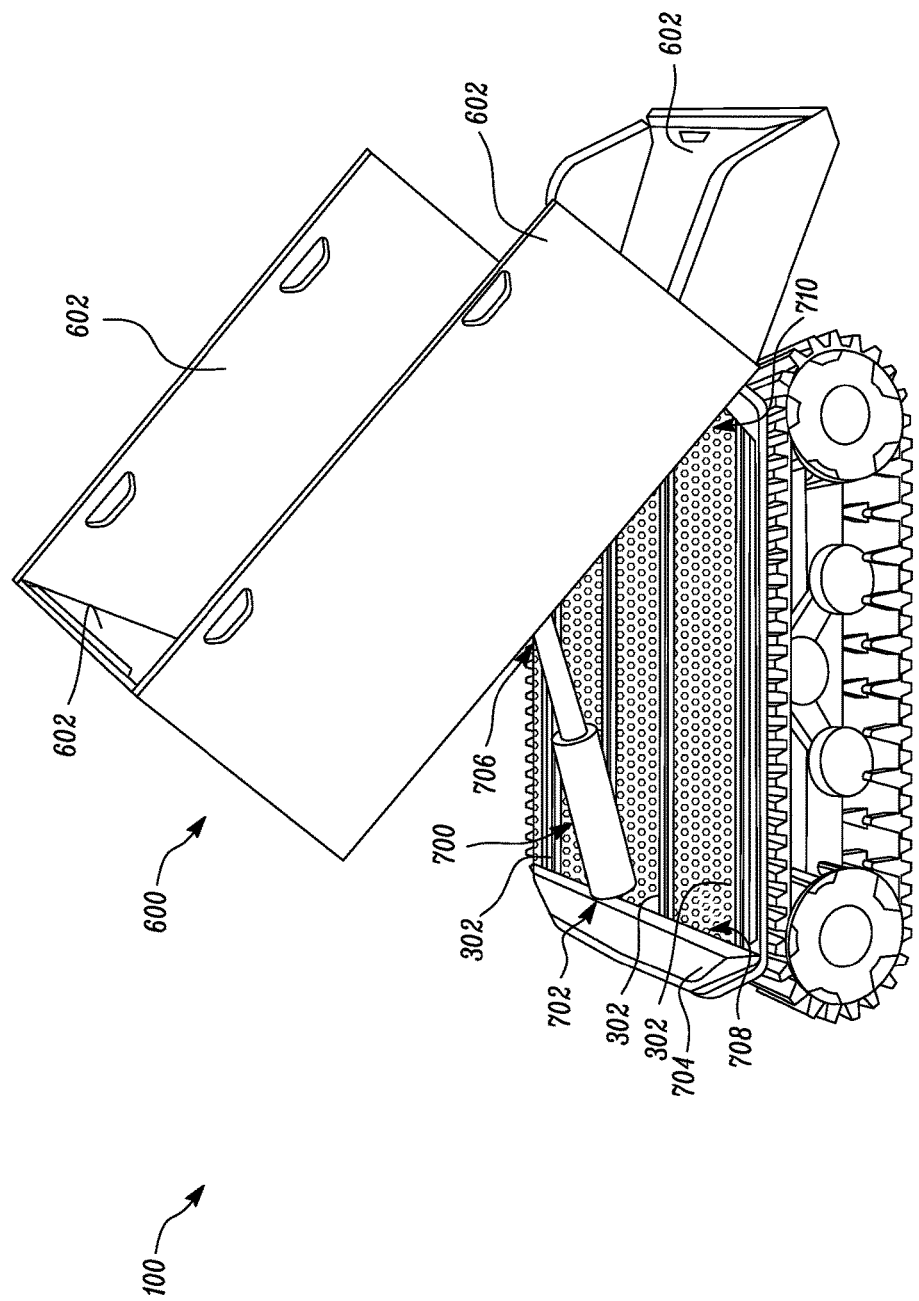
FIG. 7 is a side perspective view of the remote controlled cart showing the load cart in a tilted position, in accordance with another embodiment of the present disclosure.

FIG. 7 shows another embodiment of the present disclosure. The load carrying box 600 is coupled to the remote controlled cart 100 through a cylinder-piston assembly 700.

The cylinder-piston assembly 700 has a first end 702 coupled to the top surface 108 of the body cover 104 through a bracket 704, and a second end 706 coupled to the floor of the load carrying box 600. The bracket 704 is attached to the top surface 108 of the body cover 104 through the rails 302 at a first end 708 of the rails 302. The bracket 704 may be attached to the body cover 104 by any suitable means such as mechanical fasteners, welding etc. The load carrying box 600 is coupled to the top surface 108 of the body cover 104 at a second end 710 of the rails 302. The load carrying box 600 may be coupled to the second end 710 of the rails 302 through a hinge joint (not shown) which may facilitate tilting of the load carrying box 600 by the cylinder-piston assembly 700.

The cylinder-piston assembly 700 may provide a range of tilt angles for the load carrying box 600 according to extension and retraction of the cylinder-piston assembly 700. The cylinder-piston assembly 700 may be remotely controlled to tilt the load carrying box 600 at a desired level to dump the load being carried by the load carrying box 600. It should be contemplated that the embodiments described above are exemplary in nature and does not restrict the present disclosure to these applications only. The remote controlled cart 100 may attach a variety of task modules as per the need of the required application for which the remote controlled cart 100 is being used.

Figure 8:
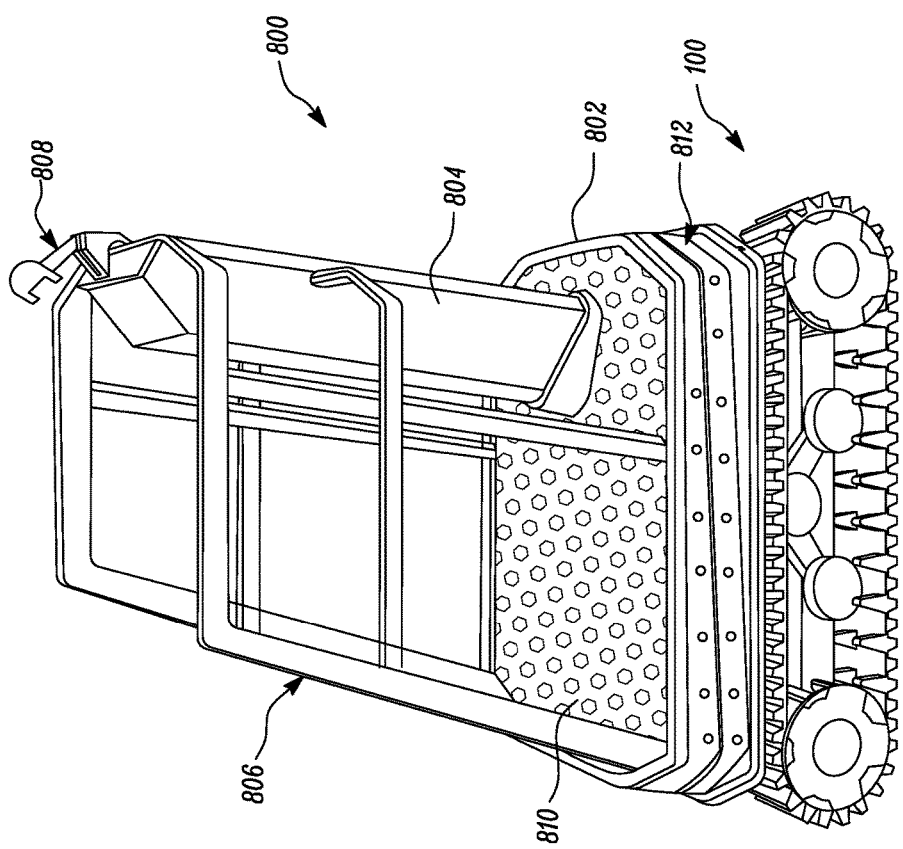
FIG. 8 is a side perspective view of the remote controlled cart including a scissor lift mechanism in a folded configuration, in accordance with another embodiment of the present disclosure.
Figure 9:
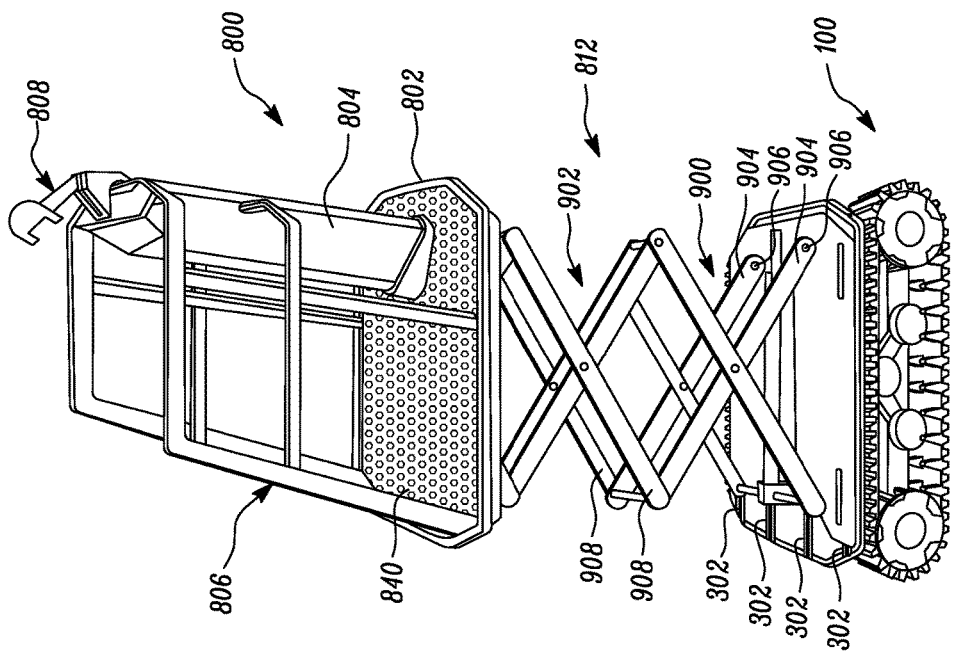
FIG. 9 is a side perspective view of the remote controlled cart including the scissor lift mechanism in an extended configuration, in accordance with another embodiment of the present disclosure.

FIGS. 8 and 9 illustrate another embodiment of the present disclosure. The remote control cart 100 includes a lift platform 800 removably coupled to the remote controlled cart 100 through the pair of rails 302 as the task module. The lift platform 800 is coupled to the remote controlled cart 100 in a similar manner in which the personnel lift platform 400 is coupled to the remote controlled cart 100. The lift platform 800 may be used to carry a personnel, or any other object as per the requirements of the application for which the remote controlled cart 100 is being used. The lift platform 800 may also lift a load, or a personnel in a vertical direction.

With reference to FIG. 8, the lift platform 800 includes a floor 802 and a support mast 804 coupled to the floor 802. A guide rail 806 supported on the support mast 804 is provided along a periphery of the floor 802 to provide support to the personnel standing on the lift platform 800. A user interface 808 is provided on the support mast 804 to control the lift platform 800 as well as the remote controlled cart 100. A non-slip mat 810 is attached to the floor to increase friction and provide better grip to the personnel standing on the lift platform 800. The non-slip mat 810 is similar to the non-slip mat 300. It should be contemplated that the lift platform 800 may also be remotely controlled in a similar manner as the remote controlled cart 100. The remote controlled cart 100 further includes a scissor lift mechanism 812 to perform the vertical lift function of the lift platform 800.

FIG. 9 shows structural details of the scissor lift mechanism 812. The scissor lift mechanism 812 may expand or retract between a folded configuration and an expanded configuration. The folded configuration corresponds to a lowest vertical position of the lift platform 800 (as shown in FIG. 8) and the expanded configuration corresponds to a highest vertical position of the lift platform 800 (as shown in FIG. 9) over the remote controlled cart 100. The lift platform 800 may be lifted to any vertical position between the highest vertical position and the lowest vertical position based on extent of expansion of the scissor lift mechanism 812. The scissor lift mechanism 812 may be controlled through the user interface 808. The scissor lift mechanism 812 may also be remotely controlled in a manner similar to the remote controlled cart 100. The scissor lift mechanism 812 has a first section 900 and a second section 902.

The first section 900 of the scissor lift mechanism 812 includes a first pair of parallel cross bar members 904 coupled to the remote controlled cart 100 through mechanical linkages 906. The first section 900 may be coupled to the remote controlled cart 100 through any other suitable mechanical joining means as well. The first section 900 is coupled to the remote controlled cart 100 at one end and the second section 902 at the other end. The second section 902 has a similar construction as the first section 900. The second section 902 includes a second pair of parallel cross bar members 908 similar to the first pair of cross bar members 904. The second section 902 is coupled to the first section 900 at one end and the floor 802 of the lift platform 800 at the other end. It should be contemplated that structural details of the scissor lift mechanism 812 are exemplary in nature, and any variations which may be suitable to the need of the present disclosure may be made to suit the need for which the remote controlled cart 100 is being used.

INDUSTRIAL APPLICABILITY

The present disclosure provides a versatile work tool for a broad spectrum of users requiring powered assistance in form of the remote controlled cart 100 which may be used for wide ranging applications. The present disclosure provides a new category of compact mobile power tool that provides accessories to make jobs easier. The remote controlled cart 100 includes the body 102 having components of the electric powertrain 200, the electric battery 202 and the electric motor 204, enclosed by the body 102 and the body cover 104. The first track assembly 110 is coupled to the body 102 towards the first side 114 of the body 102 and the second track assembly 112 is coupled to the second side 116 of the body 102.

The first and second track assemblies 110, 112 propel the remote controlled cart 100 through the power supplied by the electric powertrain 200 via the electric motor 204 and the electric battery 202. The body cover 104 includes the recesses 106 to receive the rails 302 on the top surface 108 of the body cover 104. The rails 302 may attach a variety of task modules to the remote controlled cart 100 as per the need of the application for which the remote controlled cart 100 is to be used. Some of the exemplary embodiments include the personnel lift platform 400, the load carrying box 600 etc.

Applications of the remote controlled cart 100 of the present disclosure range across various fields. For example, the remote controlled cart 100 may be used at a construction worksite to lift loads as well as personnel. The remote controlled cart 100 may be used to lift a personnel vertically by attaching the personnel lift platform 400 to the remote controlled cart 100. Further, the load carrying box 600 may be attached to the remote controlled cart 100 to lift a variety of loads. The load carrying box may also have only two walls 602 to lift loads such as pipes which may have length dimensions greater than the length of the remote controlled cart 100. The remote controlled cart 100 may be used in a household for attaching lawn equipment and performing gardening works. The remote controlled cart 100 may be used at a storage facility to transport goods from one location to another. The remote controlled cart 100 may also be used for transporting a game out of the woods to assist in a hunting operation. These are a few examples of the applications of the remote controlled cart 100.

The remote controlled cart 100 may be used across such wide ranging applications because of ease of handling offered by option of remotely controlling the remote controlled cart 100. Manual effort is saved by the remote controlled cart 100 in various applications very efficiently. Also, it is very easy to operate the remote controlled cart 100 and the user interface can be customized as per the need of the application for which the remote controlled cart 100 is to be used. A highly skilled operator is not required to operate the remote controlled cart 100 allowing for such wide ranging applications. A simple and efficient design of the electric the remote controlled cart 100 facilitates easy changeover of various attachments. Further, the simple design makes it easy to perform maintenance and service procedures.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A remote controlled cart comprising:
   a body;
   an electric battery coupled to the body;
   a pair of track assemblies coupled to the body;
   an electric motor operatively coupled to the battery, and configured to supply propulsion power to the pair of track assemblies; and
   a body cover coupled to a top surface of the body;
   wherein a top surface of the body cover includes at least one pair of recesses defined in the top surface of the body cover to receive at least one pair of rails on the top surface of the body cover, the pair of rails adapted to removably couple a task module with the body cover.

2. The remote controlled cart of claim 1, wherein the top surface of the body cover includes two pair of rails.

3. The remote controlled cart of claim 2, wherein the two pair of rails are symmetrically placed on the top surface of the body cover, and are parallel to each other.

4. The remote controlled cart of claim 1, wherein the body cover is coupled to the top surface of the body by mechanical fasteners.

5. The remote controlled cart of claim 1, wherein a non-slip mat is attached to the top surface of the body cover.

6. A remote controlled cart comprising:
   a body;
   an electric battery coupled to the body;
   a pair of track assemblies coupled to the body;
   an electric motor operatively coupled to the battery, and configured to supply propulsion power to the pair of track assemblies;
   a body cover coupled to a top surface of the body;
   at least one pair of rails attached to a top surface of the body cover; and
   a personnel lift platform removably coupled to the pair of rails, the personnel lift platform including:
   a floor;
   a plurality of support pillars attached to the floor along a periphery of the floor;
   a pair of guide rails supported by the plurality of support pillars, the pair of guide rails disposed along the periphery of the floor in a vertically spaced apart manner; and an extendable mast coupled to the pair of rails attached to the body cover, and extending across the floor, wherein the extendable mast includes a plurality of collapsible portions adapted to be extended to lift the personnel lift platform above the remote controlled cart.

7. The remote controlled cart of claim 6, wherein the extendable mast further includes a user interface device to control a height of the personnel lift platform.

8. The remote controlled cart of claim 7, wherein the user interface further includes means to control the remote controlled cart.

9. The remote controlled cart of claim 6, wherein a non-slip mat is attached to a top surface of the floor of the personnel lift platform by adhesive means.

10. The remote controlled cart of claim 6, wherein the remote controlled cart includes two pair of rails attached to the top surface of the body cover.

11. The remote controlled cart of claim 10, wherein the two pair of rails are symmetrically placed on the top surface of the body cover, and are parallel to each other.

12. A remote controlled cart comprising:
a body;
an electric battery coupled to the body;
a pair of track assemblies coupled to the body;
an electric motor operatively coupled to the battery, and configured to supply propulsion power to the pair of track assemblies;
a body cover coupled to a top surface of the body;
wherein a top surface of the body cover includes at least one pair of recesses defined in the top surface of the body cover to receive at least one pair of rails attached to a top surface of the body cover; and
a load carrying box coupled to the pair of rails, the load carrying box including a floor and a plurality of walls coupled to the floor.

13. The remote controlled cart of claim 12, wherein the load carrying box includes four walls.

14. The remote controlled cart of claim 12, wherein the load carrying box includes two walls.

15. The remote controlled cart of claim 12, wherein at least one of the plurality of walls of the load carrying box is adapted to be tilted to dump a load being carried by the load carrying box.

16. The remote controlled cart of claim 12, wherein a cylinder-piston assembly is coupled to the body cover of the remote controlled cart and the floor of the load carrying box, the cylinder-piston assembly adapted to tilt the load carrying box.

17. The remote controlled cart of claim 16, wherein the cylinder-piston assembly can be remotely controlled.

18. The remote controlled cart of claim 17, wherein the cylinder-piston assembly can be actuated by a hydraulic means or a pneumatic means.

19. The remote controlled cart of claim 12, wherein the top surface of the body cover includes two pair of rails.

* * * * *